US010065778B2

(12) United States Patent
Vyorykka et al.

(10) Patent No.: US 10,065,778 B2
(45) Date of Patent: *Sep. 4, 2018

(54) COATING COMPOSITION, A PROCESS OF PRODUCING A COATING COMPOSITION, A COATED ARTICLE, AND A METHOD OF FORMING SUCH ARTICLES

(71) Applicant: Dow Global Technologies LLC, Midland, MI (US)

(72) Inventors: Jouko Vyorykka, Richterswil (CH); David L. Malotky, Midland, MI (US); Ronald Wevers, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 307 days.

This patent is subject to a terminal disclaimer.

(21) Appl. No.: 14/950,070

(22) Filed: Nov. 24, 2015

(65) Prior Publication Data

US 2016/0145451 A1  May 26, 2016

Related U.S. Application Data

(62) Division of application No. 13/130,542, filed as application No. PCT/US2009/065445 on Nov. 23, 2009, now Pat. No. 9,221,940.

(Continued)

(51) Int. Cl.
*B65D 65/42* (2006.01)
*C09D 151/08* (2006.01)
(Continued)

(52) U.S. Cl.
CPC ............ *B65D 65/42* (2013.01); *C08F 255/00* (2013.01); *C08F 255/02* (2013.01);
(Continued)

(58) Field of Classification Search
CPC ...... C09D 7/14; C09D 7/1266; C09D 7/1275; C09D 151/08; B65D 65/42
See application file for complete search history.

(56) References Cited

U.S. PATENT DOCUMENTS 3,645,992 A   2/1972 Elston
3,686,359 A   8/1972 Soldatos et al.
(Continued)

FOREIGN PATENT DOCUMENTS

JP   62-011543   1/1987
WO  WO 95/14063  5/1995
(Continued)

OTHER PUBLICATIONS

Japanese Divisional Office Action received Oct. 1, 2016; from counterpart Japanese Divisional Application No. 2015-092566.
Japanese Divisional Office Action dated May 10; 2016; from Japanese Divisional counterpart Application No. 2015-092566.
India Office Action received May 15, 2017; from India counterpart Application No. 4013/CHENP/2011.
PCT International Search Report from counterpart PCT Application No. PCT/US2009/065445.
PCT International IPRP from counterpart PCT Application No. PCT/US2009/065445.

*Primary Examiner* — Vickey Nerangis

(57) ABSTRACT

The instant invention provides a coating composition, a process of making a coating composition, a coated article, and a method of forming such articles.

The coating composition according to the present invention comprises a dispersion comprising: (a) a core comprising a base polymer; (b) a shell at least partially surrounding said core, wherein said shell comprising a polar polymeric stabilizing agent; and (c) one or more hydrophobic particulate fillers embedded at least partially in said shell.

The process for making a coating composition according to the present invention comprises the steps of: (1) selecting a base polymer; (2) selecting a polar polymeric stabilizing agent; (3) selecting one or more hydrophobic particulate fillers; (4) melt-blending said base polymer, said polar polymeric stabilizing agent, and said one or more hydrophobic particulate fillers; (4) contacting said melt-blended base polymer, polar polymeric stabilizing agent and one or more hydrophobic particulate fillers with water and optionally in the presence of a neutralizing agent; (5) thereby forming said dispersion comprising: (a) a core comprising said base polymer; (b) a shell at least partially surrounding said core, wherein said shell comprising said polar polymeric stabilizing agent; and (c) said one or more hydrophobic particulate fillers embedded at least partially in said shell.

The coated article according to the present invention comprises: a substrate comprising cellulose base material; and a dispersion on at least one surface of said substrate, wherein said dispersion comprises: (a) a core comprising a base polymer; (b) a shell at least partially surrounding said core, wherein said shell comprising a polar polymeric stabilizing agent; and (c) one or more hydrophobic particulate fillers embedded at least partially in said shell.

The method of making a coated article according to the present invention comprises the steps of: (1) providing a substrate comprising cellulose base material (2) providing a coating composition comprising a dispersion comprising: (a) a core comprising a base polymer; (b) a shell at least partially surrounding said core, wherein said shell comprising a polar polymeric stabilizing agent; and (c) one or more hydrophobic particulate fillers embedded at least partially in said shell; (3) applying said coating composition to at least one surface of said substrate; and (4) thereby making said coated article.

25 Claims, No Drawings

Related U.S. Application Data

(60) Provisional application No. 61/122,050, filed on Dec. 12, 2008.

(51) Int. Cl.

| | | |
|---|---|---|
| *C08J 3/05* | (2006.01) | |
| *C08F 255/00* | (2006.01) | |
| *C08F 255/02* | (2006.01) | |
| *C08F 285/00* | (2006.01) | |
| *C08F 289/00* | (2006.01) | |
| *C09D 151/00* | (2006.01) | |
| *C09D 151/06* | (2006.01) | |
| *C09D 123/00* | (2006.01) | |
| *C09D 7/61* | (2018.01) | |
| *C09D 7/40* | (2018.01) | |
| *C09D 7/80* | (2018.01) | |
| *C08K 3/26* | (2006.01) | |

(52) U.S. Cl.
CPC .......... *C08F 285/00* (2013.01); *C08F 289/00* (2013.01); *C08J 3/05* (2013.01); *C09D 7/61* (2018.01); *C09D 7/67* (2018.01); *C09D 7/68* (2018.01); *C09D 7/80* (2018.01); *C09D 123/00* (2013.01); *C09D 151/003* (2013.01); *C09D 151/06* (2013.01); *C09D 151/08* (2013.01); *C08K 2003/265* (2013.01)

(56) References Cited

U.S. PATENT DOCUMENTS

| | | | |
|---|---|---|---|
| 4,009,317 A | 2/1977 | Chase et al. | |
| 4,066,628 A | 1/1978 | Ashida et al. | |
| 4,076,698 A | 2/1978 | Anderson et al. | |
| 4,438,254 A | 3/1984 | Doorakian et al. | |
| 4,480,082 A | 10/1984 | McLean et al. | |
| 4,599,392 A | 7/1986 | McKinney et al. | |
| 4,988,781 A | 1/1991 | McKinney et al. | |
| 5,073,578 A | 12/1991 | Boodaghains et al. | |
| 5,089,588 A | 2/1992 | White et al. | |
| 5,115,075 A | 5/1992 | Brennan et al. | |
| 5,164,426 A | 11/1992 | Shimizu et al. | |
| 5,171,820 A | 12/1992 | Mang et al. | |
| 5,246,751 A | 9/1993 | White et al. | |
| 5,272,236 A | 12/1993 | Lai et al. | |
| 5,278,272 A | 1/1994 | Lai et al. | |
| 5,489,648 A * | 2/1996 | Okimura | C08F 255/02 524/504 |
| 5,504,172 A | 4/1996 | Imuta et al. | |
| 5,708,093 A | 1/1998 | Bastelberger et al. | |
| 5,938,437 A | 8/1999 | De Vinzenco | |
| 6,420,469 B1 * | 7/2002 | Suda | C08J 3/09 523/205 |
| 6,525,157 B2 | 2/2003 | Cozewith et al. | |
| 6,960,635 B2 | 11/2005 | Stevens et al. | |
| 7,608,668 B2 | 10/2009 | Li Pi Shan et al. | |
| 9,221,940 B2 * | 12/2015 | Vyorykka | C08F 255/00 |
| 2007/0141323 A1 * | 6/2007 | Wevers | C08L 23/0815 428/323 |
| 2008/0057878 A1 * | 3/2008 | Staszewski | B82Y 10/00 455/87 |
| 2011/0230594 A1 * | 9/2011 | Vyorykka | C08F 255/00 523/351 |

FOREIGN PATENT DOCUMENTS

| | | |
|---|---|---|
| WO | WO 00/01745 | 1/2000 |
| WO | WO 02/44290 | 6/2002 |
| WO | WO2010068396 | 6/2010 |

\* cited by examiner

COATING COMPOSITION, A PROCESS OF PRODUCING A COATING COMPOSITION, A COATED ARTICLE, AND A METHOD OF FORMING SUCH ARTICLES

CROSS-REFERENCE TO RELATED APPLICATIONS

This application is a divisional of U.S. application Ser. No. 13/130,542, filed on May 20, 2011, which claimed priority to PCT/US2009/065445, filed Nov. 23, 2009; which claims priority to U.S. Provisional Application Ser. No. 61/122,050, filed Dec. 12, 2008, the disclosures of which are incorporated herein by reference.

FIELD OF INVENTION

The instant invention relates to a coating composition, a process of making a coating composition, a coated article, and a method of forming such articles.

BACKGROUND OF THE INVENTION

The use of polymeric materials as coating compositions as barrier applications is generally known. Such polymeric coating compositions, for example, may provide a barrier against grease, oil, water and/or vapor. Alternatively, such polymeric coating compositions may provide improved structural integrity and strength.

Despite the research efforts in developing new coating compositions, there is still a need for a coating composition having improved barrier properties such as water uptake properties, water vapor transmission properties, and oxygen transmission rate properties while maintaining oil and grease resistance properties.

SUMMARY OF THE INVENTION

The instant invention provides a coating composition, a process of making a coating composition, a coated article, and a method of forming such articles.

In one embodiment, the instant invention provides a coating composition comprising a dispersion comprising: (a) a core comprising a base polymer; (b) a shell at least partially surrounding said core, wherein said shell comprising a polar polymeric stabilizing agent; and (c) one or more hydrophobic particulate fillers embedded at least partially in said shell.

In an alternative embodiment, the instant invention further provides a process for making a coating composition comprising the steps of: (1) selecting a base polymer; (2) selecting a polar polymeric stabilizing agent; (3) selecting one or more hydrophobic particulate fillers; (4) melt-blending said base polymer, said polar polymeric stabilizing agent, and said one or more hydrophobic particulate fillers; (4) melt kneading said melt-blended base polymer, polar polymeric stabilizing agent and one or more hydrophobic particulate fillers in the presence of water and optionally in the presence of a neutralizing agent; (5) thereby forming said dispersion comprising: (a) a core comprising said base polymer; (b) a shell at least partially surrounding said core, wherein said shell comprising said polar polymeric stabilizing agent; and (c) said one or more hydrophobic particulate fillers embedded at least partially in said shell.

In another alternative embodiment, the instant invention further provides a coated article comprising: a substrate; and a dispersion on at least one surface of said substrate, wherein said dispersion comprises: (a) a core comprising a base polymer; (b) a shell at least partially surrounding said core, wherein said shell comprising a polar polymeric stabilizing agent; and (c) one or more hydrophobic particulate fillers embedded at least partially in said shell.

In another alternative embodiment, the instant invention further provides a method of making a coated article comprising the steps of: (1) providing a substrate comprising cellulose base material (2) providing a coating composition comprising a dispersion comprising: (a) a core comprising a base polymer; (b) a shell at least partially surrounding said core, wherein said shell comprising a polar polymeric stabilizing agent; and (c) one or more hydrophobic particulate fillers embedded at least partially in said shell; (3) applying said coating composition to at least one surface of said substrate; and (4) thereby making said coated article.

In an alternative embodiment, the instant invention provides a coating composition, method of producing the same, coated articles made therefrom, and method of making such coated articles, in accordance with any of the preceding embodiments, except that the base polymer is a thermoplastic polymer selected from the group consisting of an ethylene based polymer, a propylene based polymer, and combinations thereof.

In an alternative embodiment, the instant invention provides a coating composition, method of producing the same, coated articles made therefrom, and method of making such coated articles, in accordance with any of the preceding embodiments, except that the dispersion comprises 0 to 90 percent by weight of the base polymer, based on the total solid weight of the dispersion.

In an alternative embodiment, the instant invention provides a coating composition, method of producing the same, coated articles made therefrom, and method of making such coated articles, in accordance with any of the preceding embodiments, except that the dispersion comprises 10 to 50 percent by weight the polar polymeric stabilizing agent, based on the total solid weight of the dispersion.

In an alternative embodiment, the instant invention provides a coating composition, method of producing the same, coated articles made therefrom, and method of making such coated articles, in accordance with any of the preceding embodiments, except that the base polymer and polar polymeric stabilizing agent are the same type of polymeric material, provided each has a different acid number.

In an alternative embodiment, the instant invention provides a coating composition, method of producing the same, coated articles made therefrom, and method of making such coated articles, in accordance with any of the preceding embodiments, except that the one or more hydrophobic particulate fillers are selected from the group consisting of an inorganic substance, an organic substance, and combinations thereof.

In an alternative embodiment, the instant invention provides a coating composition, method of producing the same, coated articles made therefrom, and method of making such coated articles, in accordance with any of the preceding embodiments, except that the inorganic substance is selected from the group consisting of aluminum hydroxide, aragonite, barium sulphate, calcite, calcium sulphate, dolomite, magnesium hydroxide, magnesium carbonate, magnesite, ground calcium carbonate, precipitated calcium carbonate, titanium dioxide (for example, rutile and/or anatase), satin white, zinc oxide, silica, alumina trihydrate, mica, talc, clay, calcined clay, diatomaceous earth, vaterite, and combination thereof.

In an alternative embodiment, the instant invention provides a coating composition, method of producing the same, coated articles made therefrom, and method of making such coated articles, in accordance with any of the preceding embodiments, except that the one or more hydrophobic particulate fillers having a particle size diameter in the range of from 5 nm to 1 μm.

In an alternative embodiment, the instant invention provides a coating composition, method of producing the same, coated articles made therefrom, and method of making such coated articles, in accordance with any of the preceding embodiments, except that the one or more hydrophobic particulate fillers having a particle size diameter in the range of from 5 nm to 500 nm.

In an alternative embodiment, the instant invention provides a coating composition, method of producing the same, coated articles made therefrom, and method of making such coated articles, in accordance with any of the preceding embodiments, except that the one or more hydrophobic particulate fillers having a particle size diameter in the range of from 5 nm to 200 nm.

In an alternative embodiment, the instant invention provides a coating composition, method of producing the same, coated articles made therefrom, and method of making such coated articles, in accordance with any of the preceding embodiments, except that the dispersion comprises 1 to 50 percent by weight of one or more hydrophobic particulate fillers, based on the total solid weight of the dispersion.

In an alternative embodiment, the instant invention provides a coating composition, method of producing the same, coated articles made therefrom, and method of making such coated articles, in accordance with any of the preceding embodiments, except that the polar polymeric stabilizing agent is selected from the group consisting of ethylene-acrylic acid (EAA), ethylene methyl methacrylate (EMMA), ethylene butyl acrylate (EBA), and combinations thereof.

In an alternative embodiment, the instant invention provides a coating composition, method of producing the same, coated articles made therefrom, and method of making such coated articles, in accordance with any of the preceding embodiments, except that the polar polymeric stabilizing agent is neutralized from 50 to 90 percent.

In an alternative embodiment, the instant invention provides a coating composition, method of producing the same, coated articles made therefrom, and method of making such coated articles, in accordance with any of the preceding embodiments, except that the polar polymeric stabilizing agent is neutralized from 55 to 85 percent.

In an alternative embodiment, the instant invention provides a coating composition, method of producing the same, coated articles made therefrom, and method of making such coated articles, in accordance with any of the preceding embodiments, except that the dispersion has a viscosity in the range of from less than 5,000 cP.

In an alternative embodiment, the instant invention provides a coating composition, method of producing the same, coated articles made therefrom, and method of making such coated articles, in accordance with any of the preceding embodiments, except that the dispersion has a viscosity in the range of from less than 500 cP.

In an alternative embodiment, the instant invention provides a coating composition, method of producing the same, coated articles made therefrom, and method of making such coated articles, in accordance with any of the preceding embodiments, except that the dispersion has a viscosity in the range of from less than 100 cP.

In an alternative embodiment, the instant invention provides a coating composition, method of producing the same, coated articles made therefrom, and method of making such coated articles, in accordance with any of the preceding embodiments, except that the dispersion has a viscosity in the range of from less than 50 cP.

In an alternative embodiment, the instant invention provides a coating composition, method of producing the same, coated articles made therefrom, and method of making such coated articles, in accordance with any of the preceding embodiments, except that the dispersion has a pH in the range of from 8 to 12.

In an alternative embodiment, the instant invention provides a coating composition, method of producing the same, coated articles made therefrom, and method of making such coated articles, in accordance with any of the preceding embodiments, except that the dispersion has a pH in the range of from 8.5 to 10.

In an alternative embodiment, the instant invention provides a coating composition, method of producing the same, coated articles made therefrom, and method of making such coated articles, in accordance with any of the preceding embodiments, except that the dispersion has a solid average particle size diameter in the range of from 0.2 to 2 μm.

In an alternative embodiment, the instant invention provides a coating composition, method of producing the same, coated articles made therefrom, and method of making such coated articles, in accordance with any of the preceding embodiments, except that the dispersion comprises from 40 to 55 percent by volume of a liquid media, based on the total volume of the dispersion.

In an alternative embodiment, the instant invention provides a coating composition, method of producing the same, coated articles made therefrom, and method of making such coated articles, in accordance with any of the preceding embodiments, except that the liquid media is water.

In an alternative embodiment, the instant invention provides a coating composition, method of producing the same, coated articles made therefrom, and method of making such coated articles, in accordance with any of the preceding embodiments, except that the dispersion comprises one or more antifoam agents, one or more wetting agents, one or more antimicrobial agents, one or more crosslinkers, one or more rheology modifier agents, one or more auxiliary stabilizing agents, one or more antiblocking agents, one or more colorants, and one or more additional fillers; provided, however, that the addition of such additional components does not negatively impact the coating composition of the instant invention.

DETAILED DESCRIPTION OF THE INVENTION

The instant invention provides a coating composition, a process of making a coating composition, a coated article, and a method of forming such articles.

The coating composition according to the present invention comprises a dispersion comprising: (a) a core comprising a base polymer; (b) a shell at least partially surrounding said core, wherein said shell comprising a polar polymeric stabilizing agent; and (c) one or more hydrophobic particulate fillers embedded at least partially in said shell. The dispersion according to the instant invention has a solid average particle size diameter in the range of from 0.2 to 2 μm.

Base Polymer

The dispersion of the present invention comprises from 20 to 95 percent by weight of one or more base polymers, based on the total weight of the solid content of the dispersion. All individual values and subranges from 20 to 95 weight percent are included herein and disclosed herein; for example, the weight percent can be from a lower limit of 20, 25, 30, 35, 40, or 45 weight percent to an upper limit of 70, 80, 90, or 95 weight percent. For example, the dispersion may comprise from 25 to 95, or in the alternative from 35 to 90, or in the alternative from 45 to 80 percent by weight of one or more base polymers, based on the total weight of the solid content of the dispersion. The dispersion comprises at least one or more base polymers. The base polymer may, for example, be selected from the group consisting of a thermoplastic material, and a thermoset material. The one or more base polymers comprise one or more olefin based polymers, one or more acrylic based polymers, one or more polyester based polymers, one or more solid epoxy polymers, one or more thermoplastic polyurethane polymers, one or more styrenic based polymers, and combinations thereof.

Examples of thermoplastic materials include, but are not limited to, homopolymers and copolymers (including elastomers) of an alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

Examples of suitable (meth)acrylates, as base polymers, include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In selected embodiments, base polymer comprises a polyolefin selected from the group consisting of ethylene-alpha olefin copolymers, and propylene-alpha olefin copolymers. In particular, in select embodiments, the base polymer comprises one or more non-polar polyolefins.

In specific embodiments, polyolefins such as polypropylene, polyethylene, copolymers thereof, and blends thereof, as well as ethylene-propylene-diene terpolymers, may be used. In some embodiments, preferred olefinic polymers include homogeneous polymers, as described in U.S. Pat. No. 3,645,992 issued to Elston; high density polyethylene (HDPE), as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In one embodiment, the base polymer is a propylene-based copolymer or interpolymer. In some particular embodiments, the propylene/ethylene copolymer or interpolymer is characterized as having substantially isotactic propylene sequences. The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by 13C NMR spectra. Such propylene based copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In other particular embodiments, the base polymer may be ethylene vinyl acetate (EVA) based polymers. In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In certain embodiments, the base polymer may be a propylene-ethylene copolymer or interpolymer having an ethylene content between 5 and 20 percent by weight and a melt flow rate (230° C. with 2.16 kg weight) from 0.5 to 300 g/10 min. In other embodiments, the propylene-ethylene copolymer or interpolymer may have an ethylene content between 9 and 12 percent by weight and a melt flow rate (230° C. with 2.16 kg weight) from 1 to 100 g/10 min.

In other embodiments, the base polymer may have a crystallinity of less than 50 percent. In preferred embodiments, the crystallinity of the base polymer may be from 5 to 35 percent. In more preferred embodiments, the crystallinity may range from 7 to 20 percent.

In certain other embodiments, the base polymer is a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, for example, ethylene multi-block copolymer, such as those described in the U.S. patent application Ser. No. 11/376,835 may be used as the base polymer. Such olefin block copolymer may be an ethylene/α-olefin interpolymer:

(a) having a $M_w/M_n$ from 1.7 to 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2;\text{ or}$$

(b) having a $M_w/M_n$ from 1.7 to 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T > 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of 1:1 to 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the base polymer comprises a polar polymer, having a polar group as either a comonomer or grafted monomer. In exemplary embodiments, the base polymer comprises one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary base polymers include, but are not limited to, ethylene ethyl acrylate (EEA) copolymer, ethylene methyl methacrylate (EMMA), and ethylene butyl acrylate (EBA).

In one embodiment, the base polymer comprises a polar polyolefin selected from the group consisting of ethylene-acrylic acid (EAA) copolymer, ethylene-methacrylic acid copolymer, and combinations thereof, and the stabilizing agent comprises a polar polyolefin selected from the group consisting of ethylene-acrylic acid (EAA) copolymer, ethylene-methacrylic acid copolymer, and combinations thereof; provided, however, that base polymer has a lower acid number that the stabilizing agent.

In certain embodiments, the base polymer may, for example, comprise an epoxy resin. Epoxy resin refers to a composition which possesses one or more vicinal epoxy groups per molecule, that is, at least one 1,2-epoxy group per molecule. In general, such compound is a saturated or unsaturated aliphatic, cycloaliphatic, aromatic or heterocyclic compound which possesses at least one 1,2-epoxy group. Such compound can be substituted, if desired, with one or more non-interfering substituents, such as halogen atoms, hydroxy groups, ether radicals, lower alkyls and the like.

Illustrative epoxies are described in the *Handbook of Epoxy Resins* by H. E. Lee and K. Neville published in 1967 by McGraw-Hill, New York and U.S. Pat. No. 4,066,628, incorporated herein by reference.

Particularly useful compounds which can be used in the practice of the present invention are epoxy resins having the following formula:

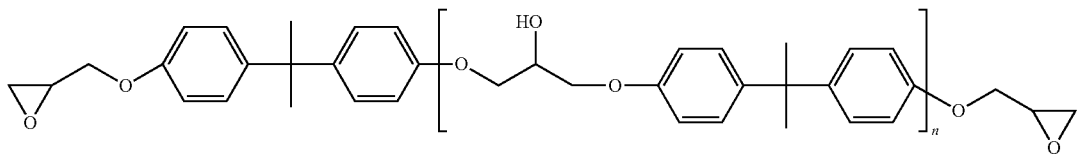

wherein n has an average value of 0 or more.

The epoxy resins useful in the present invention may include, for example, the glycidyl polyethers of polyhydric phenols and polyhydric alcohols. As an illustration of the present invention, examples of known epoxy resins that may be used in the present invention, include for example, the diglycidyl ethers of resorcinol, catechol, hydroquinone, bisphenol, bisphenol A, bisphenol AP (1,1-bis(4-hydroxyphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A and any combination thereof.

Examples of diepoxides particularly useful in the present invention include diglycidyl ether of 2,2-bis(4-hydroxyphenyl) propane (generally referred to as bisphenol A) and diglycidyl ether of 2,2-bis(3,5-dibromo-4-hydroxyphenyl) propane (generally referred to as tetrabromobisphenol A). Mixtures of any two or more polyepoxides can also be used in the practice of the present invention.

Other diepoxides which can be employed in the practice of the present invention include the diglycidyl ethers of dihydric phenols, such as those described in U.S. Pat. Nos. 5,246,751; 5,115,075; 5,089,588; 4,480,082 and 4, 438,254, all of which are incorporated herein by reference, or the diglycidyl esters of dicarboxylic acids such as those described in U.S. Pat. No. 5,171,820. Other suitable diepoxides include for example, αω-diglycidyloxyisopropylidene-bisphenol-based epoxy resins (commercially known as D.E.R.® 300 and 600 series epoxy resins, products of The Dow Chemical Company, Midland, Mich.).

The epoxy resins which can be employed in the practice of the present invention also include epoxy resins prepared either by reaction of diglycidyl ethers of dihydric phenols with dihydric phenols or by reaction of dihydric phenols with epichlorohydrin (also known as "taffy resins").

Exemplary epoxy resins include, for example, the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

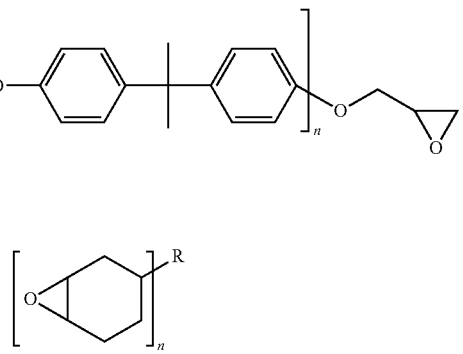

wherein R is a hydrocarbon group optionally comprising one or more heteroatoms (such as, without limitation thereto Cl, Br, and S), or an atom or group of atoms forming a stable bond with carbon (such as, without limitation thereto, Si, P and B) and wherein n is greater than or equal to 1.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexylmethyl)-3,4-epoxy-cyclohexane carboxylate, bis-(3,4-epoxycyclohexyl) adipate, vinylcyclohexene monoxide and mixtures thereof.

In certain embodiments, the base polymer comprises a thermoplastic polyurethane polymer. Such thermoplastic polyurethane polymers are generally know, and further described, for example, in the International Publication No. 2008/057878, incorporated herein by reference to the extent that it describes a thermoplastic polyurethane polymer.

Those having ordinary skill in the art will recognize that the above list is a non-comprehensive listing of exemplary base polymers. It will be appreciated that the scope of the present invention is restricted by the claims only.

Polymeric Stabilizing Agent

The dispersion may further comprise at least one or more polymeric stabilizing agents to promote the formation of a stable dispersion. The dispersion of the instant invention comprises 10 to 60 percent by weight of one or more polymeric stabilizing agents, based on the total weight of the solid content of the dispersion. All individual values and subranges from 10 to 60 weight percent are included herein and disclosed herein; for example, the weight percent can be from a lower limit of 10, 15, 17, or 20 weight percent to an upper limit of 35, 45, 50, 55, or 60 weight percent. For example, the dispersion may comprise from 10 to 55, or in the alternative from 10 to 50, or in the alternative from 15 to 45, or in the alternative from 15 to 35, or in the alternative from 20 to 45 percent by weight of one or more polymeric stabilizing agents, based on the total weight of the solid content of the dispersion. In certain embodiments, the polymeric stabilizing agent can be a polar polymer, having a polar group as either a comonomer or grafted monomer. In exemplary embodiments, the polymeric stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Those having ordinary skill in the art will recognize that a number of other useful polymers may also be used.

If the polar group of the polymer is acidic or basic in nature, the polymeric stabilizing agent may be partially or fully neutralized with a neutralizing agent to form the corresponding salt. In certain embodiments, neutralization of the stabilizing agent, such as EAA, may be from 25 to 200 percent on a molar basis; or in the alternative, it may be from 50 to 110 percent on a molar basis; or in the alternative, it may be from 50 to 90 percent on a molar basis; or in the alternative, it may be from 50 to 75 percent on a molar basis. For example, for EAA, the neutralizing agent may be a base, such as ammonium hydroxide or potassium hydroxide. In the alternative, for EAA, the neutralizing agent may, preferably, be a base, such potassium hydroxide. Other neutralizing agents can include lithium hydroxide or sodium hydroxide, for example. In another alternative, the neutralizing agent may, for example, be any amine such as monoethanolamine, or 2-amino-2-methyl-1-propanol (AMP). Those having ordinary skill in the art will appreciate that the selection of an appropriate neutralizing agent depends on the specific composition formulated, and that such a choice is within the knowledge of those of ordinary skill in the art. The amount of neutralizing agent necessary to neutralize the polymeric stabilizing agent may be reduced by using appropriate basic inorganic particles as described hereinabove.

Additional stabilizing agents that may be useful in the practice of the present invention include, but are not limited to, anionic surfactants, or a non-ionic surfactants. Examples of anionic surfactants include, but are not limited to, sulfonates, carboxylates, and phosphates. Examples of non-ionic surfactants include, but are not limited to, block copolymers containing ethylene oxide and silicone surfactants. Additional stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts.

Hydrophobic Particulate Filler

The dispersion comprises 1 to 50 percent by weight of one or more hydrophobic particulate fillers, based on the total weight of the solid content of the dispersion. All individual values and subranges from 1 to 50 weight percent are included herein and disclosed herein; for example, the weight percent can be from a lower limit of 1, 3, 5, 10 weight percent to an upper limit of 15, 25, 35, 45, or 50 weight percent. For example, the dispersion may comprise from 1 to 25, or in the alternative from 1 to 35, or in the alternative from 1 to 40, or in the alternative from 1 to 45 percent by weight of one or more hydrophobic particulate fillers, based on the total weight of the solid content of the dispersion. Such hydrophobic particulate fillers include, but are note limited to inorganic particles, organic particles, and combinations thereof. The hydrophobic particulate fillers may have an average particle size diameter in the range of 5 nm to 500 nm. All individual values and subranges from 5 nm to 500 nm are included herein and disclosed herein; for example, the average particle size diameter can be from a lower limit of 5, 10, 20, 30, 40, or 50 nm to an upper limit of less than 100, 100, 200, 250, 300, 350, 400, 450, or 500 nm. For example, hydrophobic particulate fillers may have an average particle size diameter in the range of 5 nm to 400 nm, or in the alternative, 5 nm to 350 nm, or in the alternative 5 nm to 300 nm, or in the alternative 5 nm to 250 nm, or in the alternative 5 nm to 200 nm, or in the alternative 5 nm to 100 nm, or in the alternative 5 nm to less than 100 nm.

The inorganic particles used in the present invention may comprise a mixture of different inorganic particles with different properties. The inorganic particles used in the present invention are preferably basic. Either the inorganic particles can be intrinsically basic or alternatively they may be treated to obtain basic functional groups on the surface. If it is desired to employ non-basic inorganic particles, then it is preferred to treat the non-basic inorganic particles so that they exhibit basic groups on the surface. Examples of such treatment include contacting the inorganic particles with an aqueous solution of at least one hydrolysable polyvalent metal salt, followed by neutralization. The treatment is preferably carried out before the fatty acid or salt thereof is coated on the inorganic particles. The inorganic particles used in the present invention include, but are not limited to, at least one or more substances selected from the group consisting of aluminum hydroxide, aragonite, barium sulphate, calcite, calcium sulphate, dolomite, magnesium hydroxide, magnesium carbonate, magnesite, ground calcium carbonate, precipitated calcium carbonate, titanium dioxide (for example, rutile and/or anatase), satin white, zinc oxide, silica, alumina trihydrate, mica, talc, clay, calcined clay, diatomaceous earth, and vaterite or any combination thereof. If the particles are not intrinsically basic they need to be treated by any suitable method to make them basic. The inorganic particles are preferably calcium carbonate particles, more preferably precipitated calcium carbonate. In the alternative, the hydrophobic particulate fillers may be an inorganic particle selected from the group consisting of calcium carbonate, for example, precipitated calcium carbonate, calcium sulphate, for example, gypsum, barium sulphate, aluminum oxide, alumina trihydrate (ATH), $TiO_2$, fumed silica, precipitated silica, carbon black, synthetic layered silicates, for example, mica or fluoro mica, natural layered silicates, for example, montmorillonite, hectorite, saponite, or vermiculite, nanoclays, for example, natural or synthetic layered silicates containing modifiers improving intercalation and exfoliation, magnesium hydroxide, magnesium carbonate, zinc borate, and talc.

Exemplary organic particles include, but are not limited to, polystyrene based pigments (or plastic pigment, for example, styrene, styrene butadiene copolymer), starch based pigments, and the like.

Fluid Medium

The dispersion further comprises a fluid medium. The fluid medium may be any medium; for example, the fluid medium may be water. The dispersion of the instant invention comprises 40 to 70 percent by volume of fluid medium, based on the total volume of the dispersion. In particular embodiments, the water content may be in the range of from 25 to 65, or in the alternative from 35 to 65, or in the alternative from 40 to 55 percent by volume, or in the alternative from 45 to 55 percent by volume, based on the total volume of the dispersion. Water content of the dispersion may preferably be controlled so that the solids content (base polymer plus stabilizing agent) is between 1 percent to 74 percent by volume. In particular embodiments, the solids range may be between 10 percent to 70 percent by volume. In other particular embodiments, the solids range is between 20 percent to 60 percent by volume. In certain other embodiments, the solids range is between 30 percent to 55 percent by volume.

Fillers for the Coating Composition

The coating composition may further comprise one or more fillers. Such fillers include, but are not limited to, include conventional fillers such as milled glass, calcium carbonate, aluminum trihydrate, talc, antimony trioxide, fly ash, clays (such as bentonite or kaolin clays for example), or other known fillers.

Additives for the Coating Composition

The coating composition may further include additives. Exemplary additives may include, but are not limited to, a wetting agent, surfactants, anti-static agents, antifoam agent, anti block agents, crosslinking agents, wax-dispersion pigments, waxes, neutralizing agents, thickeners, compatibilizers, brighteners, rheology modifiers, a biocides, a fungicides, and other additives known to those skilled in the art.

Application

The coating composition according to the instant invention may be applied to a substrate. Exemplary suitable substrates include, but are not limited to, sheet, non-woven material, woven material, film, foams, and the like. Such substrate may comprise organic based materials, inorganic materials, and combinations thereof. The substrate may, for example, comprise a cellulose based material, a natural polymeric based material, a synthetic polymeric based material, a metal based material, a mineral based, and combinations thereof. The substrate may be porous, for example, micro-porous. The coating composition may be applied to the substrate via a conventional method for applying a coating composition. Such methods are generally known, and include, but are not limited to spraying, dipping, roll coating, blade coating, curtain coating, printing techniques such as flexography and rotogravure, size press, metered size press, screen coating, rod coating combinations thereof, and the like. The coating composition may be applied to the substrate in any amount. For example, the coating composition may be applied to the substrate in an amount to produce a coated substrate having a coat weight, based on the dry weight of the dispersion, in the range of 0.5 g per $m^2$ of the substrate to 200 g per $m^2$ of the substrate, in the range of 0.1 g per $m^2$ of the substrate to 500 g per $m^2$ of the substrate, in the range of 0.5 g per $m^2$ of the substrate to 100 g per $m^2$ of the substrate, in the range of 0.5 g per $m^2$ of the substrate to 10 g per $m^2$ of the substrate. After the substrate is coated with the coating composition, at least a portion of the liquid media may be removed. The dispersion applied onto a substrate may be dried via any conventional drying method. Such conventional drying methods include but, are not limited to, air drying, convection oven drying, hot air drying, microwave oven drying, and/or infrared oven drying. The dispersion applied onto a substrate may be dried at any temperature; for example, it may be dried at a temperature in the range of equal or greater than the melting point temperature of the base polymer; or in the alternative, it may be dried at a temperature in the range of less than the melting point of the base polymer. The dispersion applied onto a substrate may be dried at a temperature in the range of 60° F. (15.5° C.) to 700° F. (371° C.). All individual values and subranges from 60° F. (15.5° C.) to 700° F. (371° C.) are included herein and disclosed herein; for example, the dispersion applied onto a substrate may be dried at a temperature in the range of 60° F. (15.5° C.) to 500° F. (260° C.), or in the alternative, the dispersion applied onto a substrate may be dried at a temperature in the range of 60° F. (15.5° C.) to 450° F. (232.2° C.). The temperature of the dispersion applied onto a substrate may be raised to a temperature in the range of equal or greater than the melting point temperature of the base polymer for a period of less than about 40 minutes. All individual values and subranges from less than about 40 minutes are included herein and disclosed herein; for example, the temperature of the dispersion applied onto a substrate may be raised to a temperature in the range of equal or greater than the melting point temperature of the base polymer for a period of less than about 20 minutes, or in the alternative, the temperature of the dispersion applied onto a substrate may be raised to a temperature in the range of equal or greater than the melting point temperature of the base polymer for a period of less than about 10 minutes, or in another alternative, the temperature of the dispersion applied onto a substrate may be raised to a temperature in the range of equal or greater than the melting point temperature of the base polymer for a period in the range of 0.1 to 600 seconds. In another alternative, the temperature of the dispersion applied onto a substrate may be raised to a temperature in the range of less than the melting point temperature of the base polymer for a period of less than 40 minutes. All individual values and subranges from less than about 40 minutes are included herein and disclosed herein; for example, the temperature of the dispersion applied onto a substrate may be raised to a temperature in the range of less than the melting point temperature of the base polymer for a period of less than about 20 minutes, or in the alternative, the temperature of the dispersion applied onto a substrate may be raised to a temperature in the range of less than the melting point temperature of the base polymer for a period of less than about 10 minutes, or in another alternative, the temperature of the dispersion applied onto a substrate may be raised to a temperature in the range of less than the melting point temperature of the base polymer for a period in the range of 0.1 to 600 seconds.

Drying the dispersion applied onto a substrate at a temperature in the range of equal or greater than the melting point temperature of the base polymer facilitates the formation of a film having a continuous base polymer phase with a discrete stabilizing agent phase dispersed therein the continuous base polymer phase thereby further improving barrier properties.

End-Use Applications

The coating compositions according to the present invention may be used as barrier coatings such as water barrier coatings, vapor barrier coatings, oil and grease barrier coatings, and combinations thereof. Inventive articles according to instant invention include food packaging articles such as pet food bags, frozen food bags, and the like.

Forming the Dispersion

The dispersion can be formed by any number of methods recognized by those having skill in the art. In one embodiment, one or more base polymers, one or more polar polymeric stabilizing agents, and one or more hydrophobic particulate fillers are melt-kneaded in an extruder in the presence of water and optionally one or more neutralizing agents, such as ammonia, potassium hydroxide, or a combination of the two to form a dispersion compound. In another embodiment, one or more polar polymeric stabilizing agents and one or more hydrophobic particulate fillers are compounded, and then the compound is melt-kneaded in an extruder in the presence of one or more base polymers, water, and one or more neutralizing agents. In some embodiments, the dispersion is first diluted to contain 1 to 3 percent by weight water and then, subsequently, further diluted to comprise greater than about 25 percent by weight water.

Any melt-kneading means known in the art may be used. In some embodiments, a kneader, a BANBURY® mixer, single-screw extruder, or a multi-screw extruder, for example, a twin screw extruder, is used. A process for producing the dispersions in accordance with the present invention is not particularly limited. For example, an extruder, in certain embodiments a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more base polymers, in the form of pellets, powder, or flakes, may be fed from the feeder to an inlet of the extruder where the resin is melted or compounded. One or more polar polymeric stabilizing agents, and one or more hydrophobic particulate fillers first also may be fed simultaneously with one or more base polymers into the extruder via the feeder; or in the alternative, one or more hydrophobic particulate fillers may be compounded into one or more polar polymeric stabilizing agents, and then fed into the extruder via the feeder with one or more base polymers. In some embodiments, additional polar polymeric stabilizing agents may further be metered into the extruder. The resin melt is then delivered from the mix and convey zone to an emulsification zone of the extruder where the initial amount of water and base from the water and base reservoirs are added through an inlet. In some embodiments, additional surfactants may be added additionally or exclusively to the water stream. In some embodiments, the melt blended mixture is further diluted with additional water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated.

EXAMPLES

The following examples illustrate the present invention but are not intended to limit the scope of the invention.

Inventive Dispersions 1-2

The inventive dispersions were made according to the following procedure. One or more base polymer resins, one or more polymeric stabilizing agent resins, and one or more hydrophobic particulate fillers, as shown in Table I, were selected, and fed into a twin screw extruder simultaneously. Pellets of AFFINITY 8200 and pellets of PRIMACOR 5980 were physically mixed together in a ratio of 85 parts AFFINITY to 15 parts PRIMACOR 5980 prior to addition to the extruder with a Schenck Mechatron loss in weight solids feeder. The pressure in the extruder was maintained at 300 psi throughout the run. These components were melt blended in the compounding zone of the extruder thereby forming a melt blended compound. Subsequently, water and base was metered into the extruder, and the melt blended compound was contacted with water in the presence of the base. Further water was metered into the extruder thereby further diluting the dispersion. The formulations for inventive dispersions are reported in Table I. The extrusion conditions are reported in Table II. The inventive dispersions were tested for their properties, and those properties are listed in Table III. The inventive dispersions were applied to a cellulosic based substrate, that is paper boards supplied from Stora Enso Oyj. having a gramage of approximately 240 g/m². The properties of the inventive coated substrates 1-2 were tested, and reported in Table IV.

The comparative dispersions were made according to the following procedure. One or more base polymer resins, and one or more polymeric stabilizing agent resins, as shown in Table I, were selected, and fed into a twin screw extruder simultaneously. These components were and melt blended in the compounding zone of the extruder thereby forming a melt blended compound. Subsequently, water and base was metered into the extruder, and the melt blended compound was contacted with water in the presence of the base. Further water is metered into the extruder thereby further diluting the dispersion. The formulation components for comparative dispersions are reported in Table I. The extrusion conditions are shown in Table II. The comparative dispersions were tested for their properties, and those properties are listed in Table III. The comparative dispersions were applied to cellulosic based substrates, that is paper boards supplied from Stora Enso Oyj. having a grammage of approximately 240 g/m². The properties of the comparative coated substrates 1-3 were tested, and reported in Table IV.

TABLE I

|  | Raw Material Solid Content [%] | Inventive Dispersion 1 | Inventive Dispersion 2 | Comparative Dispersion 1 | Comparative Dispersion 2 | Comparative Dispersion 3 |
| --- | --- | --- | --- | --- | --- | --- |
| Sample 8.6 wt % CaCO$_3$: (AFFINITY 8200/PRIMACOR 5980i) | 47.9 | 100 | — | — | — | — |
| Sample 14.6 wt % CaCO$_3$: (Affinity 8200/Primacor 5980i) | 51.0 | — | 100 | — | — | — |
| POD 8501 [control 2] (Affinity 8200/Primacor 5980i) | 47.7 | — | — | 100 | 100 | 100 |
| Setacarb (post addition of CaCO$_3$) from Omya | 75.0 | — | — | — | 9.4 | 17.1 |
| Formulation Solid Content [%] | — | 40 | 40 | 40 | 40 | 40 |
| pH-value | — | 10.5 | 10.5 | 10.2 | 10.2 | 10.2 |

TABLE II

| Sample | Initial Water Flow Rate (g/min) | Base Flow Rate (base is 45% wt KOH) (g/min) | Polymer Mix Flow Rate (g/min) | CaCO$_3$ Flow Rate (g/min) | Dilution Water Flow Rate (g/min) | Barrel Temp. °C. | Screw RPM | Vmean Particle Size (μm) |
| --- | --- | --- | --- | --- | --- | --- | --- | --- |
| Inventive Dispersion 1 | 12.7 | 2.9 | 68.0 | 7.6 | 63.2 | 150 | 400 | 0.51 |
| Inventive Dispersion 2 | 12.7 | 2.9 | 60.4 | 15.2 | 63.2 | 150 | 400 | 0.66 |
| Comparative Dispersion 1 | 12.7 | 3.6 | 75.6 | 0 | 62.5 | 160 | 500 | 0.8 |

TABLE III

3M Kit Rating Test Results

| Sample | Flat Kit Rating Number |
| --- | --- |
| Inventive 1 | 12 |
| Inventive 2 | 12 |
| Comparative 1 | 12 |
| Comparative 2 | 12 |
| Comparative 3 | 12 |

TABLE IV

| Dispersion | Cobb Test (g/m$^2$) water uptake | WVTR (g/m$^2$/24 hr) water vapor transmission rate (RH 50%, 25° C.) | WVTR (g/m$^2$/24 hr) water vapor transmission rate RH 90%, 38° C. | OTR (cc/m$^2$/day) Oxygen Transmission Rate |
| --- | --- | --- | --- | --- |
| Inventive Dispersion 1 | 4.4 | 11.9 | 288.7 | 21,460 |
| Inventive Dispersion 2 | 3.0 | 13.7 | 222.7 | 19,340 |
| Comparative Dispersion 1 | 14.5 | 37.1 | 670 | 24,422 |
| Comparative Dispersion 2 | 16.1 | 17.4 | 573.9 | 31,889 |
| Comparative Dispersion 3 | 14.5 | 19 | 599.3 | 23,601 |

Test Methods

Test methods include the following:

The Cobb water resistance test was measured via Tappi Test Method T 441 om-90 under the following conditions for coated paperboards:

Test period: 2 minutes
Sample size: 13 cm$^2$
Amount of deionized water: 100 ml

The oxygen transmission rate (OTR) measurement was performed by measuring oxygen permeability using a measuring apparatus (Model OX-TRAN Model 2/21, manufactured by Mocon, Inc.) at a temperature of 23° C. and a relative humidity (RH) of 50 percent. Within this instrument, each measurement unit is composed of two cells, which are separated by the sample. In one cell carrier gas (nitrogen) is routed, where the other cell is flushed with a test gas (oxygen). Both gases have a defined temperature and relative humidity (RH). After the measurement is started, oxygen is allowed to enter the Coulox sensor. This sensor, when exposed to oxygen, generates an electrical current which is proportional to the amount of oxygen entered.

The water vapor transmission rate (WVTR) was measured using ASTM E96-80 dish test. The test measures the transmission of moisture from a wet chamber through a test specimen (sheet) and into a dry chamber containing a desiccant.

3M Kit Test

Grease and oil kit testing liquids are made according to formulas shown in Table A. Castor oil (USP Grade 99-100 percent), toluene (ACS Grade, 99.5 percent min. by gas chromatography), heptane (Reagent grade, 99.9 percent min. with 99.0 percent n-heptane) are purchased from VWR International.

TABLE A

Composition of Kit Test Liquids

| Kit # | 1 | 2 | 3 | 4 | 5 | 6 | 7 | 8 | 9 | 10 | 11 | 12 |
|---|---|---|---|---|---|---|---|---|---|---|---|---|
| Castor Oil (g) | 100 | 90 | 80 | 70 | 60 | 50 | 40 | 30 | 20 | 10 | 0 | 0 |
| Toluene (g) | 0 | 5 | 10 | 15 | 20 | 25 | 30 | 35 | 40 | 45 | 50 | 45 |
| Heptane (g) | 0 | 5 | 10 | 15 | 20 | 25 | 30 | 35 | 40 | 45 | 50 | 55 |

The oil and grease resistance "Kit Test" is performed on the samples according to TAPPI UM 557 "Repellency of Paper and Board to Grease, Oil, and Waxes (Kit Test)." The Kit Test is a procedure for testing the degree of repellency of paper or paperboard having a coating.

The Kit Test is conducted as follows. Obtain five representative samples (5.08 cm×5.08 cm) of each of the coated base papers. Deposit one drop of the Kit Rating Number test reagent onto a flat surface of the coated base paper having the coating composition of the present disclosure from a height of 2.54 cm. After 15 seconds, wipe away the excess Kit Rating Number test reagent with a clean tissue or cotton swatch. Immediately examine the surface of the coated base paper.

The coated base paper is assigned a failure if the test surface shows a pronounced darkening as compared to an untested coated base paper. If, however, the coated base paper passes, repeat the above described test with a new sample of coated base paper with the next higher Kit Rating Number test reagent until a failure Kit Rating Number test reagent is found. The average of the five highest passing Kit Rating Number test reagent rounded to the nearest 0.5 is reported as the flat Kit Rating Number for the coating composition on the coated base paper.

The present invention may be embodied in other forms without departing from the spirit and the essential attributes thereof, and, accordingly, reference should be made to the appended claims, rather than to the foregoing specification, as indicating the scope of the invention.

We claim:

1. A food packaging article comprising:
   a substrate; and
   a coating layer disposed at least on a surface of said substrate, wherein said coating layer is derived from an aqueous polyolefin dispersion which comprises
   a core comprising a base polymer, wherein said base polymer is selected from the group consistin of ethylene/acrylic acid copolymers and ethylene/methacrylic acid copolymers;
   a shell at least partially surrounding said core, wherein said shell comprises a polar polymeric stabilizing agent; and
   one or more hydrophobic particulate fillers having a particle size diameter in the range of from 5 nm to 250 nm embedded at least partially in said shell,
   wherein coating layer comprises a continuous base polymer phase with discrete stabilizing agent phase dispersed therein the continuous base polymer phase.

2. The food packaging article of claim 1, wherein the aqueous polyolefin dispersion comprises 20 to 90 percent by weight of the base polymer, based on the total solid weight of the aqueous polyolefin dispersion.

3. The food packaging article of claim 1, wherein the aqueous polyolefin dispersion comprises 10 to 50 percent by weight the polar polymeric stabilizing agent, based on the total solid weight of the aqueous polyolefin dispersion.

4. The food packaging article of claim 1, wherein the base polymer and polar polymeric stabilizing agent are the same polymeric material, provided each has a different acid number.

5. The food packaging article of claim 1, wherein the one or more hydrophobic particulate fillers are selected from the group consisting of an inorganic substance, an organic substance, and combinations thereof.

6. The food packaging article of claim 1, wherein the one or more hydrophobic particulate fillers are inorganic substances selected from the group consisting of aluminum hydroxide, aragonite, barium sulphate, calcite, calcium sulphate, dolomite, magnesium hydroxide, magnesium carbonate, magnesite, ground calcium carbonate, precipitated calcium carbonate, rutile titanium dioxide, anatase titanium dioxide, satin white, zinc oxide, silica, alumina trihydrate, mica, talc, clay, calcined clay, diatomaceous earth, vaterite, and combination thereof.

7. The food packaging article of claim 1, wherein the aqueous polyolefin dispersion comprises 1 to 50 percent by weight of the one or more hydrophobic particulate fillers, based on the total solid weight of the dispersion.

8. The food packaging article of claim 1, wherein the polar polymeric stabilizing agent is selected from the group consisting of ethylene-acrylic acid (EAA), ethylene methyl methacrylate (EMMA), ethylene butyl acrylate (EBA), and combinations thereof.

9. The food packaging article of claim 1, wherein the polar polymeric stabilizing agent is neutralized from 50 to 90 percent.

10. The food packaging article of claim 1, wherein the aqueous polyolefin dispersion has a solid average particle size distribution in the range of from 0.2 to 2 μm.

11. The food packaging article of claim 1, wherein the aqueous polyolefin dispersion has a pH in the range of from 8 to 12.

12. The food packaging article of claim 1, wherein the aqueous polyolefin dispersion comprises from 40 to 55 percent by volume of a liquid media, based on the total volume of the aqueous polyolefin dispersion.

13. A process for making a food packaging device comprising:
selecting a substrate; and
disposing an aqueous polyolefin dispersion on a surface of said substrate, wherein said aqueous polyolefin dispersion comprises
a core comprising a base polymer, wherein said base polymer is selected from the group consisting of ethylene/acrylic acid copolymers and ethylene/methacrylic acid copolymers;
a shell at least partially surrounding said core, wherein said shell comprises a polar polymeric stabilizing agent; and
one or more hydrophobic particulate fillers having a particle size diameter in the range of from 5 nm to 250 nm embedded at least partially in said shell;
drying said aqueous dispersion disposed on a surface of said substrate at a temperature in the range of equal to or greater than the melting point temperature of the base polymer, thereby forming a coated substrate, wherein a coating layer is disposed at least on a surface of said substrate, wherein said coating layer comprises a continuous base polymer phase with discrete stabilizing agent phase dispersed therein the continuous base polymer phase;
forming said coated substrate into the food packaging article.

14. The process for making a food packaging article of claim 13, wherein the base polymer is a thermoplastic polymer selected from the group consisting of an ethylene based polymer, a propylene based polymer, and combinations thereof.

15. The process for making a food packaging article of claim 13, wherein the aqueous polyolefin dispersion comprises 20 to 90 percent by weight of the base polymer, based on the total solid weight of the aqueous polyolefin dispersion.

16. The process for making a food packaging article of claim 13, wherein the aqueous polyolefin dispersion comprises 10 to 50 percent by weight the polar polymeric stabilizing agent, based on the total solid weight of the aqueous polyolefin dispersion.

17. The process for making a food packaging article of claim 13, wherein the base polymer and polar polymeric stabilizing agent are the same polymeric material, provided each has a different acid number.

18. The process for making a food packaging article of claim 13, wherein the one or more hydrophobic particulate fillers are selected from the group consisting of an inorganic substance, an organic substance, and combinations thereof.

19. The process for making a food packaging article of claim 13, wherein the one or more hydrophobic particulate fillers are inorganic substances selected from the group consisting of aluminum hydroxide, aragonite, barium sulphate, calcite, calcium sulphate, dolomite, magnesium hydroxide, magnesium carbonate, magnesite, ground calcium carbonate, precipitated calcium carbonate, titanium dioxide (e.g. rutile and/or anatase), satin white, zinc oxide, silica, alumina trihydrate, mica, talc, clay, calcined clay, diatomaceous earth, vaterite, and combination thereof.

20. The process for making a food packaging article of claim 13, wherein the aqueous polyolefin dispersion comprises 1 to 50 percent by weight of the one or more hydrophobic particulate fillers, based on the total solid weight of the dispersion.

21. The process for making a food packaging article of claim 13, wherein the polar polymeric stabilizing agent is selected from the group consisting of ethylene-acrylic acid (EAA), ethylene methyl methacrylate (EMMA), ethylene butyl acrylate (EBA), and combinations thereof.

22. The process for making a food packaging article of claim 13, wherein the polar polymeric stabilizing agent is neutralized from 50 to 90 percent.

23. The process for making a food packaging article of claim 13, wherein the aqueous polyolefin dispersion has a solid average particle size distribution in the range of from 0.2 to 2 μm.

24. The process for making a food packaging article of claim 13, wherein the aqueous polyolefin dispersion has a pH in the range of from 8 to 12.

25. The process for making a food packaging article of claim 13, wherein the aqueous polyolefin dispersion comprises from 40 to 55 percent by volume of a liquid media, based on the total volume of the aqueous polyolefin dispersion.

* * * * *